United States Patent [19]

Laor

[11] Patent Number: 4,787,695
[45] Date of Patent: Nov. 29, 1988

[54] OPTICAL FIBER CONNECTOR AND ASSEMBLY METHOD THEREOF

[76] Inventor: Herzl Laor, 8 Rehov Pines, Rehovot, Israel

[21] Appl. No.: 813,248

[22] Filed: Dec. 24, 1985

[51] Int. Cl.⁴ .............................................. G02B 6/36
[52] U.S. Cl. ................................................. 350/96.20
[58] Field of Search ................ 350/96.20, 96.21, 96.23

[56] References Cited

U.S. PATENT DOCUMENTS

| | | | |
|---|---|---|---|
| 4,113,346 | 9/1978 | Jackson et al. | 350/96.2 |
| 4,119,363 | 10/1978 | Camlibel et al. | |
| 4,198,119 | 4/1980 | Uberbacher . | |
| 4,208,093 | 6/1980 | Borsuk | 350/96.21 |
| 4,218,113 | 8/1980 | Uberbacher | 350/96.21 |
| 4,264,128 | 4/1981 | Young . | |
| 4,296,998 | 10/1981 | Dufft | 350/96.2 |
| 4,386,821 | 6/1983 | Simon et al. | 350/96.2 |
| 4,389,086 | 6/1983 | Furusawa et al. | 350/96.2 |
| 4,456,334 | 6/1984 | Henry et al. | 350/96.2 |
| 4,482,201 | 11/1984 | Dousset . | |
| 4,577,925 | 3/1986 | Winter et al. | 350/96.23 |

FOREIGN PATENT DOCUMENTS

| | | |
|---|---|---|
| 2016729 | 9/1979 | United Kingdom . |
| 1573245 | 8/1980 | United Kingdom . |
| 2057936 | 4/1981 | United Kingdom . |
| 2073440 | 10/1981 | United Kingdom ............. 350/96.23 |
| 2078995 | 1/1982 | United Kingdom . |
| 2153159 | 8/1985 | United Kingdom . |
| 8402582 | 7/1984 | World Int. Prop. O. . |
| 8503361 | 8/1985 | World Int. Prop. O. . |

Primary Examiner—Charles T. Jordan
Assistant Examiner—Richard W. Wendtland
Attorney, Agent, or Firm—Abelman Frayne Rezac & Schwab

[57] ABSTRACT

A fiber optic connector comprising a ferrule having formed therein an elongate bore for receiving an optical fiber, an optical fiber disposed within the elongate bore; and soldering material operative to fix the orientation of the optical fiber in the elongate bore.

8 Claims, 1 Drawing Sheet

U.S. Patent  Nov. 29, 1988  4,787,695

OPTICAL FIBER CONNECTOR AND ASSEMBLY METHOD THEREOF

FIELD OF THE INVENTION

The present invention relates to fiber optics apparatus generally and more particularly to fiber optics connectors.

BACKGROUND OF THE INVENTION

Various types of fiber optics connectors are known in the art. Generally these connectors are made by first precisely positioning the fiber in a connector housing, then gluing the fiber in its precise position to the connector housing and finally machining and polishing the butt end of the optical fiber, thus glued, to define a connector surface. It is also known to crimp the optical fiber prior to gluing in order to prevent longitudinal movement thereof during the subsequent steps.

The above-described technique of producing fiber optics connectors is extremely slow and time consuming and is therefore very costly. The limited throughput of connectors is presently considered a principal limiting factor to the widespread use of fiber optics apparatus.

There is known in U.S. Pat. No. 4,119,363 a package for optical devices including an optical fiber to metal hermetic seal which includes a solder seal. There are also known in U.S. Pat. Nos. 4,264,128 and 4,482,201 techniques for positioning optical fibers in a connector using filler material, such as a polymerized resin.

SUMMARY OF THE INVENTION

The present invention seeks to provide a fiber optic connector and a technique for manufacturing thereof which are relatively inexpensive and simple and which have significantly higher throughput of accurate connectors than presently known techniques.

There is thus provided in accordance with an embodiment of the present invention a fiber optic connector comprising a ferrule having formed therein an elongate bore for receiving an optical fiber, an optical fiber disposed within the elongate bore; and soldering material operative to fix the orientation of the optical fiber in the elongate bore.

Additionally in accordance with an embodiment of the invention the ferrule is formed with an intermediate side opening communicating with the elongate bore for permitting access to the optical fiber for soldering thereof.

In accordance with an additional embodiment of the present invention, the ferrule defines a recess having respectively angled bearing walls for precisely defining the positioning of an optical fiber which is located thereagainst.

There is also provided in accordance with a preferred embodiment of the present invention, a fiber optic connector comprising a ferrule having formed therein an elongate bore for receiving an optical fiber, an optical fiber disposed within the elongate bore and having an outer diameter smaller than the inner diameter of the elongate bore, soldering material filling the volume between the optical fiber and the inner surface of the elongate bore, the distribution of the soldering material determining the precise transverse orientation of the optical fiber in the elongate bore.

In accordance with a preferred embodiment of the present invention, there is provided at least one access conduit communicating with the elongate bore for permitting insertion of the soldering material thereinto.

In accordance with a preferred embodiment of the invention, the at least one access conduit comprises a plurality of access conduits communicating with the elongate bore at different radial locations therealong.

Additionally in accordance with a preferred embodiment of the invention, there is provided a method for producing a fiber optic connector comprising the steps of providing a ferrule having formed therein an elongate bore for receiving an optical fiber, inserting an optical fiber having an outer diameter smaller than the inner diameter of the elongate bore within the elongate bore, and soldering the optical fiber in place in the ferrule.

Further in accordance with an embodiment of the invention the method also comprises the step of providing at least one access conduit communicating with the elongate bore.

Further in accordance with an embodiment of the invention, the method also includes the step of determining the precise transverse orientation of the optical fiber in the elongate bore by filling the volume between the optical fiber and the inner surface of the elongate bore with soldering material.

Additionally in accordance with an embodiment of the invention, the step of determining includes the steps of inserting soldering material into the elongate bore through a plurality of access conduits under selectable pressures, thereby to determine the orientation of the optical fiber in the elongate bore.

Additionally in accordance with an embodiment of the present invention there is also provided the step of determining the precise longitudinal orientation of the free end of the optical fiber.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
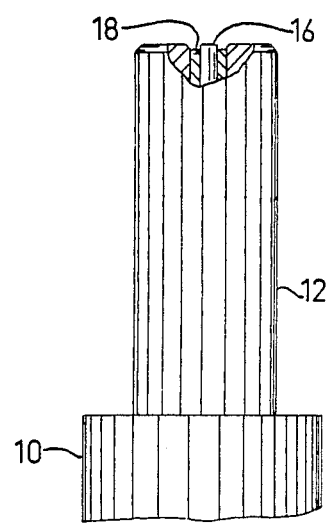
FIG. 1 is a pictorial side view illustration of a fiber optics connector constructed and operative in accordance with one embodiment of the present invention.

Reference is now made to FIG. 1 which illustrates a fiber optics connector constructed and operative in accordance with a preferred embodiment of the present invention and comprising a base portion 10 onto which is mounted or with which is integrally formed a ferrule portion 12 defining an elongate bore 14 through which extends an optical fiber 16. The base portion 10 and ferrule 12 are typically formed of metal or a suitable ceramic material.

According to a preferred embodiment of the present invention, the inside diameter of bore 14 is somewhat bigger than the outer diameter of the fiber so as to permit the insertion of soldering material 18, such as Indium or an alloy of 90% Indium and 10% Silver, therebetween, so as to secure the fiber in place in the ferrule. Typical relative diameters are as follows: fiber outer diameter 125 microns, bore inner diameter 127 microns or larger.

According to a preferred embodiment of the present invention, the connector is assembled according to the following general technique. A ferrule having an elongate bore 14 is provided, as is an optical fiber 16. The butt end of the optical fiber is precisely cut prior to or following insertion into the ferrule, as by cleavage. Its desired longitudinal position relative to the ferrule is then precisely determined as is its transverse orientation in the ferrule. The fiber is then soldered by suitable soldering material to the ferrule and the connector is completed.

Figure 2:
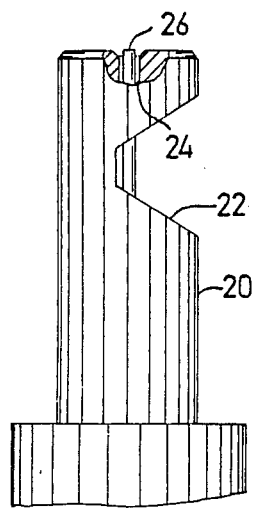
FIG. 2 is a pictorial side view illustration of a fiber optics connector constructed and operative in accordance with an alternative embodiment of the present invention.

Reference is now made to FIG. 2, which illustrates an alternative embodiment of the invention wherein there is provided a ferrule 20 having a side cut 22 therein which communicates with an elongate bore 24 through which an optical fiber 26 extends. This embodiment provides ease of access to the fiber in the bore for soldering of the fiber to the bore.

The method of assembling the connector of FIG. 2 is essentially identical to the method of assembling the connector of FIG. 1, described hereinabove.

Figure 3:
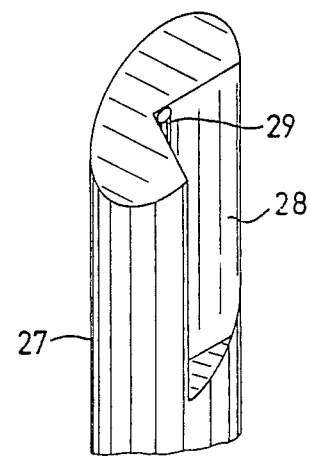
FIG. 3 is a pictorial side view illustration of a fiber optics connector constructed and operative in accordance with still another alternative embodiment of the invention.

Turning to FIG. 3, there is seen an embodiment of the invention wherein a ferrule 27 defines angled bearing surfaces 28 at the junction of which an optical fiber 29 is placed to precisely define its transverse positioning and to which it is soldered by appropriate soldering materials, to fix both its transverse and longitudinal positioning.

Figure 4:
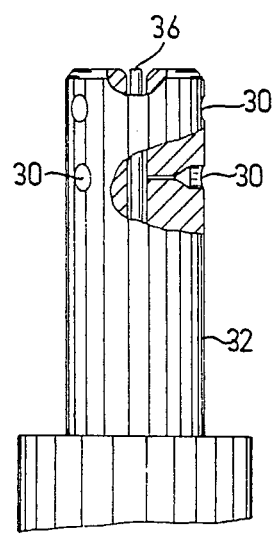
FIG. 4 is a pictorial side view illustration of a fiber optics connector constructed and operative in accordance with yet another alternative embodiment of the invention.

Referring now to FIG. 4, there is shown another preferred embodiment of the invention, which constitutes a variation of the embodiment of FIG. 1. Here, there are provided a plurality of radially distributed access apertures 30 at one or more longitudinal locations along a ferrule 32 and in communication with an elongate bore 34 formed therein and in which an optical fiber 36 is formed. According to a preferred embodiment of the present invention, soldering material is forced into the bore 34 through apertures 30. The pressure applied to the soldering material being simultaneously inserted at the various radially separated bores may be varied so as to determine the relative amount of soldering material alongside the fiber in each direction and to thus determine the transverse orientation of the fiber to significant accuracy.

Thus according to a preferred embodiment of the present invention, the method of producing an optical fiber connector of the type illustrated in FIG. 4 may be summarized as follows:

A ferrule 32 having an elongate bore 34 is provided, as is an optical fiber 36. The butt end of the optical fiber is precisely cut prior to or following insertion into the ferrule, as by cleavage. Its desired longitudinal position relative to the ferrule is then precisely determined. The transverse orientation of the fiber 36 in the ferrule is determined by forcing relatively viscous soldering material into the bore 34 from a plurality of directions through apertures 30. The relative pressures at which the soldering material is forced into the bore 34 determines the relative amount of soldering material which lies between the outer surface of the fiber 36 and the inner surface of the bore 34 in all directions and thus determines the orientation of the optical fiber transverse to the longitudinal axis of bore 34. Once the soldered connection sets, the connector is completed.

It will be apparent to persons skilled in the art that the present invention is not limited to what has been particularly shown and described hereinabove. Rather the scope of the present invention is defined only by the claims which follow:

I claim:

1. A method for producing a fiber optic connector comprising the steps of:

providing a ferrule having formed therein an elongate bore for receiving an optical fiber, the dimensions of said bore being larger than those of said fiber, whereby the orientation of said fiber in said bore may be selectably determined;

inserting an optical fiber having an outer diameter smaller than the inner diameter of the elongate bore within the elongate bore;

selectably precisely positioning said optical fiber in said bore, and soldering the optical fiber in place in the ferrule.

2. A method according to claim 1 and also comprising the step of providing at least one access conduit communicating with the elongate bore.

3. A method according to claim 1 and also including the step of determining the precise transverse orientation of the optical fiber in the elongate bore by filling the volume between the optical fiber and the inner surface of the elongate bore with soldering material.

4. A method according to claim 2 and also including the step of determining the precise transverse orientation of the optical fiber in the elongate bore by filling the volume between the optical fiber and the inner surface of the elongate bore with soldering material.

5. A method according to claim 4 and wherein the step of determining includes the steps of inserting soldering material into the elongate bore through a plurality of access conduits under selectable pressures, thereby to determine the orientation of the optical fiber in the elongate bore.

6. A method according to claim 1 and also comprising the step of determining the precise longitudinal orientation of the free end of the optical fiber.

7. A method according to claim 2 and also comprising the step of determining the precise longitudinal orientation of the free end of the optical fiber.

8. A method according to claim 3 and also comprising the step of determining the precise longitudinal orientation of the free end of the optical fiber.

* * * * *